United States Patent
Syrjarinne et al.

(10) Patent No.: US 9,234,958 B2
(45) Date of Patent: Jan. 12, 2016

(54) METHOD, APPARATUS, AND COMPUTER PROGRAM PRODUCT FOR DISTRIBUTED INDOOR THREE-DIMENSIONAL RADIOMAP

(75) Inventors: Jari Tapani Syrjarinne, Tampere (FI); Lauri Johannes Wirola, Tampere (FI); Tommi Antero Laine, Tampere (FI)

(73) Assignee: Nokia Technologies Oy, Espoo (FI)

( * ) Notice: Subject to any disclaimer, the term of this patent is extended or adjusted under 35 U.S.C. 154(b) by 437 days.

(21) Appl. No.: 13/450,990

(22) Filed: Apr. 19, 2012

(65) Prior Publication Data

US 2013/0281111 A1 Oct. 24, 2013

(51) Int. Cl.
*H04W 24/00* (2009.01)
*G01S 5/02* (2010.01)
*H04W 64/00* (2009.01)

(52) U.S. Cl.
CPC .............. *G01S 5/0252* (2013.01); *H04W 64/00* (2013.01)

(58) Field of Classification Search
CPC ....... H04W 4/02; H04W 48/04; H04W 60/04; H04W 64/00; H04W 40/20
See application file for complete search history.

(56) References Cited

U.S. PATENT DOCUMENTS

| | | | |
|---|---|---|---|
| 2007/0133487 A1* | 6/2007 | Wang et al. | 370/338 |
| 2009/0043504 A1 | 2/2009 | Bandyopadhyay et al. | |
| 2009/0054076 A1* | 2/2009 | Evennou et al. | 455/456.1 |
| 2009/0082034 A1* | 3/2009 | Gray et al. | 455/456.1 |
| 2010/0106745 A1* | 4/2010 | Cho et al. | 707/802 |
| 2012/0007779 A1* | 1/2012 | Klepal et al. | 342/451 |
| 2012/0044265 A1* | 2/2012 | Khorashadi et al. | 345/641 |
| 2012/0149415 A1* | 6/2012 | Valaee et al. | 455/507 |
| 2013/0162481 A1 | 6/2013 | Parvizi et al. | |
| 2013/0196682 A1* | 8/2013 | Kristoffersen et al. | 455/456.1 |

FOREIGN PATENT DOCUMENTS

| | | |
|---|---|---|
| WO | WO2010106530 | 9/2010 |
| WO | WO2011144968 | 11/2011 |

OTHER PUBLICATIONS

Klingbeil, L., et al; A Modular and Mobile System for Indoor Localization; 2010 International Conference on Indoor Positioning and Indoor Navigation (IPIN) Sep. 15-17, 2010, Zurich, Switzerland, pp. 1-10.
International Search Report for International Application No. PCT/IB2013/053023 mailed Aug. 20, 2013.

* cited by examiner

*Primary Examiner* — Vladimir Magloire
*Assistant Examiner* — Shantell L Heiber
(74) *Attorney, Agent, or Firm* — Locke Lord LLP

(57) ABSTRACT

Method, apparatus, and computer program product example embodiments provide wireless position determination. According to an example embodiment, a method comprises generating in a mobile wireless device, grid nodes representing one or more floor areas in an enclosed space, based on a map of the enclosed space; estimating locations along a path of motion of a user of the mobile wireless device traversing the one or more floor areas, based on motion observations made by a motion sensor in the mobile wireless device and map information; generating a radiomap of the one or more floor areas by making radio measurements with the mobile wireless device, at the estimated locations along the path of motion, mapping the measurements to the generated grid nodes that are closest to the estimated locations; and compiling a fingerprint data structure of the radiomap, including observation elements representing the radio measurements at the mapped grid nodes.

22 Claims, 10 Drawing Sheets

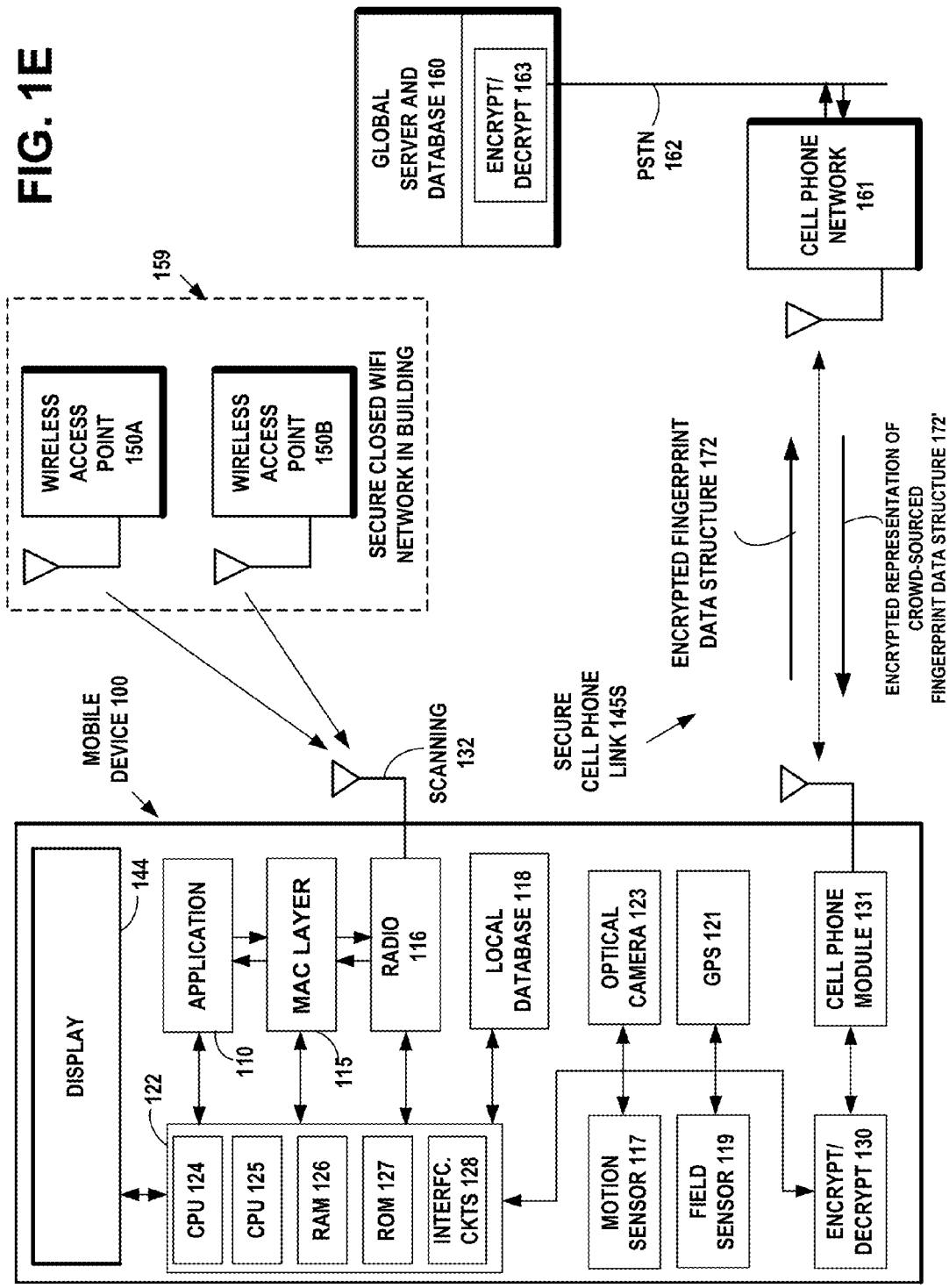

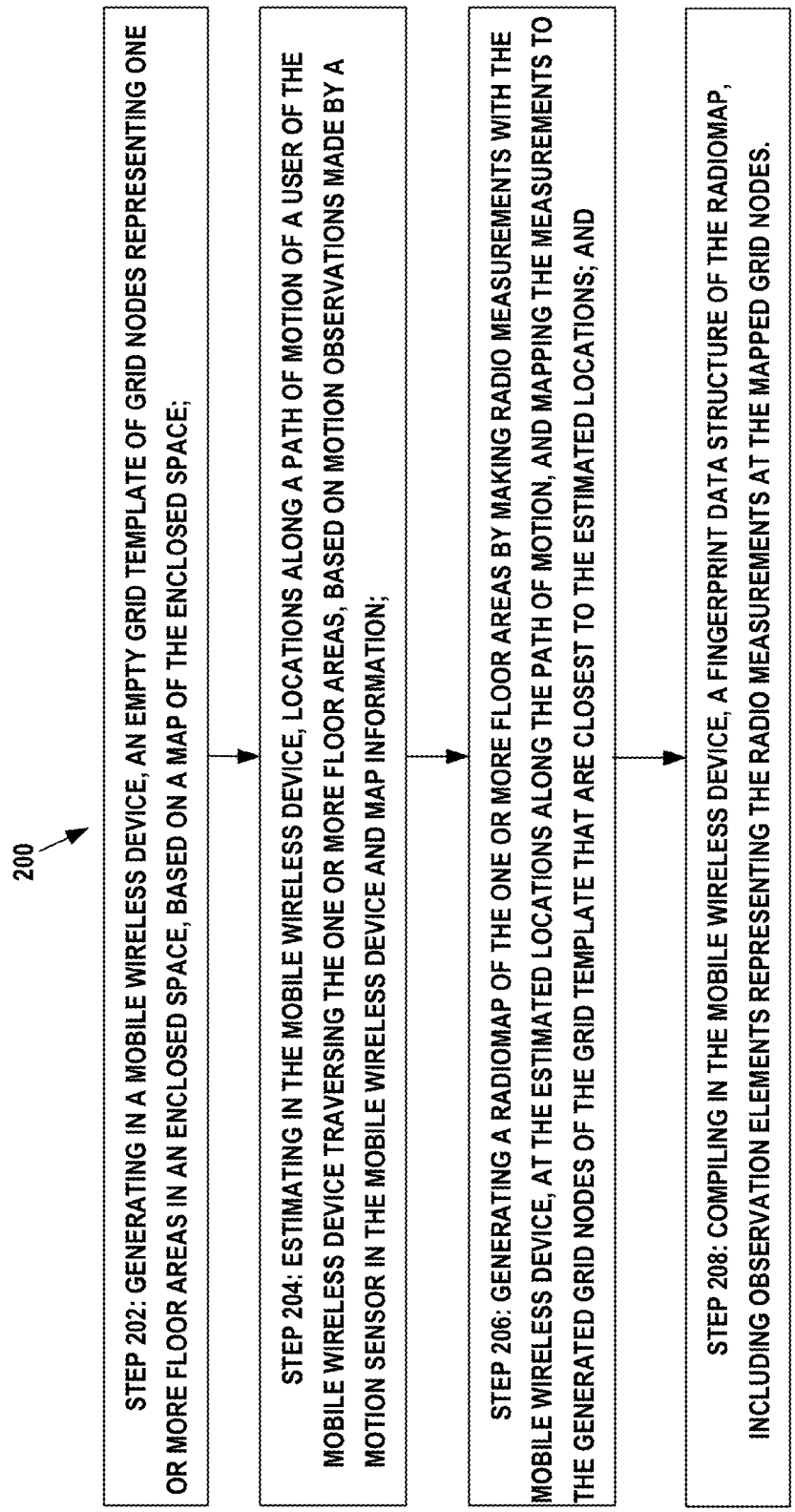

FIG. 2A
PROCESS IN MOBILE DEVICE 100

STEP 202: GENERATING IN A MOBILE WIRELESS DEVICE, AN EMPTY GRID TEMPLATE OF GRID NODES REPRESENTING ONE OR MORE FLOOR AREAS IN AN ENCLOSED SPACE, BASED ON A MAP OF THE ENCLOSED SPACE;

STEP 204: ESTIMATING IN THE MOBILE WIRELESS DEVICE, LOCATIONS ALONG A PATH OF MOTION OF A USER OF THE MOBILE WIRELESS DEVICE TRAVERSING THE ONE OR MORE FLOOR AREAS, BASED ON MOTION OBSERVATIONS MADE BY A MOTION SENSOR IN THE MOBILE WIRELESS DEVICE AND MAP INFORMATION;

STEP 206: GENERATING A RADIOMAP OF THE ONE OR MORE FLOOR AREAS BY MAKING RADIO MEASUREMENTS WITH THE MOBILE WIRELESS DEVICE, AT THE ESTIMATED LOCATIONS ALONG THE PATH OF MOTION, AND MAPPING THE MEASUREMENTS TO THE GENERATED GRID NODES OF THE GRID TEMPLATE THAT ARE CLOSEST TO THE ESTIMATED LOCATIONS; AND

STEP 208: COMPILING IN THE MOBILE WIRELESS DEVICE, A FINGERPRINT DATA STRUCTURE OF THE RADIOMAP, INCLUDING OBSERVATION ELEMENTS REPRESENTING THE RADIO MEASUREMENTS AT THE MAPPED GRID NODES.

FIG. 2B
PROCESS IN GLOBAL SERVER/DATABASE
160

STEP 252: RECEIVING AT A SERVER, A FINGERPRINT DATA STRUCTURE OF A RADIOMAP REPRESENTING ONE OR MORE FLOOR AREAS IN AN ENCLOSED SPACE, FROM A MOBILE WIRELESS DEVICE, THE FINGERPRINT DATA STRUCTURE INCLUDING OBSERVATION ELEMENTS REPRESENTING RADIO MEASUREMENTS AT MAPPED GRID NODES OF ONE OR MORE FLOOR AREAS, AND

STEP 254: COMBINING AT THE SERVER, THE RECEIVED RADIOMAP WITH RADIOMAPS OF THE ONE OR MORE FLOOR AREAS, RECEIVED FROM OTHER MOBILE WIRELESS DEVICES.

EXAMPLE OF A FINGERPRINT DATA STRUCTURE 172

US 9,234,958 B2

METHOD, APPARATUS, AND COMPUTER PROGRAM PRODUCT FOR DISTRIBUTED INDOOR THREE-DIMENSIONAL RADIOMAP

FIELD

The field of the invention relates to electronic positioning, and more particularly to wireless position determination.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

At least one communication-related application currently being offered in various forms is electronic positioning. Basic electronic positioning may provide the current location of a device in terms of coordinates, in relation to a visual map. However, the means by which the raw positioning information is obtained may vary. Offerings may include the incorporation of Global Positioning System (GPS) receivers in a device for obtaining the electronic positioning information from satellites. Further, long range wireless communication systems, such as cellular telephony, may also provide electronic positioning information through methods such as cell-based triangulation. Short-range wireless systems may be able to provide similar information through a determination of proximity of a device to a particular wireless access point.

SUMMARY

Method, apparatus, and computer program product example embodiments provide wireless position determination.

In an example embodiment of the invention, a method comprises:

generating in a mobile wireless device, grid nodes representing one or more floor areas in an enclosed space, based on a map of the enclosed space;

estimating in the mobile wireless device, locations along a path of motion of a user of the mobile wireless device traversing the one or more floor areas, based on motion observations made by a motion sensor in the mobile wireless device and map information;

generating a radiomap of the one or more floor areas by making radio measurements with the mobile wireless device, at the estimated locations along the path of motion, and mapping the measurements to the generated grid nodes that are closest to the estimated locations; and compiling in the mobile wireless device, a fingerprint data structure of the radiomap, including observation elements representing the radio measurements at the mapped grid nodes.

In an example embodiment of the invention, a method comprises:

wherein the path of motion of a user of the mobile wireless device traverses floor areas in two or more stories of a multistory building and the radiomap and fingerprint data structure represent the floor areas in the two or more stories of the multistory building.

In an example embodiment of the invention, a method comprises:

wherein the measurements are at least one of MAC addresses, received signal strength indication (RSSI), radio frequency (F), electromagnetic field strength, electromagnetic radiation intensity and power.

In an example embodiment of the invention, a method comprises:

transmitting the fingerprint data structure of the radiomap to one or more global servers for combining at the server with radiomaps of the one or more floor areas, from other mobile wireless devices.

In an example embodiment of the invention, a method comprises:

sending a request to a global server for a fingerprint data structure of a radiomap of representing floor areas in two or more stories of a multistory building; and receiving information representing a fingerprint data structure of a radiomap representing the requested floor areas, which is a representation of a combination of two or more radiomaps from other mobile wireless devices.

In an example embodiment of the invention, a method comprises:

accessing the fingerprint data structure of the radiomap, including observation elements representing the radio measurements at the mapped grid nodes;

learning more accurate position information by repeating estimating in the mobile wireless device, locations along a repeated path of motion of the user of the mobile wireless device repeating a traverse of the one or more floor areas, based on motion observations made by a motion sensor in the mobile wireless device;

repeating making radio measurements with the mobile wireless device, at the estimated repeated locations along the repeated path of motion, and mapping the repeated measurements to grid nodes that are closest to the estimated repeated locations; and combining in the mobile wireless device, the repeated measurements with the measurements represented by the observation elements of the fingerprint data structure of the radiomap, to learn a refined radiomap of the one or more floor areas.

In an example embodiment of the invention, a method comprises:

receiving at a server, a fingerprint data structure of a radiomap representing one or more floor areas in an enclosed space, from a mobile wireless device, the fingerprint data structure including observation elements representing radio measurements at mapped grid nodes of one or more floor areas, and combining at the server, the received radiomap with radiomaps of the one or more floor areas, received from other mobile wireless devices.

In an example embodiment of the invention, a method comprises:

wherein the received radiomap and the radiomaps received from other mobile wireless devices, represent floor areas in two or more stories of a multistory building.

In an example embodiment of the invention, a method comprises:

wherein the observation elements represent radio measurements that are of at least one of MAC addresses, received signal strength indication (RSSI), radio frequency (F), electromagnetic field strength, and electromagnetic radiation intensity and power.

In an example embodiment of the invention, a method comprises:

receiving a request from a mobile wireless device for a fingerprint data structure of a radiomap of representing floor areas in two or more stories of a multistory building; and transmitting to the mobile wireless device information representing a fingerprint data structure of a radiomap representing the requested floor areas, which is a representation of a combination of two or more radiomaps from other mobile wireless devices.

In an example embodiment of the invention, an apparatus comprises:

at least one processor;

at least one memory including computer program code;

the at least one memory and the computer program code configured to, with the at least one processor, cause the apparatus at least to:

generate grid nodes representing one or more floor areas in an enclosed space, based on a map of the enclosed space;

estimate locations along a path of motion of a user of the mobile wireless device traversing the one or more floor areas, based on motion observations made by a motion sensor in the apparatus and map information;

generate a radiomap of the one or more floor areas by making radio measurements with the apparatus, at the estimated locations along the path of motion, and mapping the measurements to the generated grid nodes that are closest to the estimated locations; and compiling a fingerprint data structure of the radiomap, including observation elements representing the radio measurements at the mapped grid nodes.

In an example embodiment of the invention, an apparatus comprises:

wherein the path of motion of a user of the apparatus traverses floor areas in two or more stories of a multistory building and the radiomap and fingerprint data structure represent the floor areas in the two or more stories of the multistory building.

In an example embodiment of the invention, an apparatus comprises:

wherein the radio measurements are at least one of MAC addresses, received signal strength indication (RSSI), radio frequency (F), electromagnetic field strength, and electromagnetic radiation intensity and power.

In an example embodiment of the invention, an apparatus comprises:

the at least one memory and the computer program code configured to, with the at least one processor, cause the apparatus at least to:

transmit the fingerprint data structure of the radiomap to one or more global servers for combining at the server with radiomaps of the one or more floor areas, from other mobile wireless devices.

In an example embodiment of the invention, an apparatus comprises:

the at least one memory and the computer program code configured to, with the at least one processor, cause the apparatus at least to:

send a request to a global server for a fingerprint data structure of a radiomap of representing floor areas in two or more stories of a multistory building; and receive information representing a fingerprint data structure of a radiomap representing the requested floor areas, which is a representation of a combination of two or more radiomaps from other mobile wireless devices.

In an example embodiment of the invention, an apparatus comprises:

the at least one memory and the computer program code configured to, with the at least one processor, cause the apparatus at least to:

access the fingerprint data structure of the radiomap, including observation elements representing the radio measurements at the mapped grid nodes;

learn more accurate position information by repeating estimating locations along a repeated path of motion of the user of the apparatus repeating a traverse of the one or more floor areas, based on motion observations made by a motion sensor in the apparatus;

repeat making radio measurements with the apparatus, at the estimated repeated locations along the repeated path of motion, and map the repeated measurements to grid nodes that are closest to the estimated repeated locations; and combine the repeated measurements with the measurements represented by the observation elements of the fingerprint data structure of the radiomap, to learn a refined radiomap of the one or more floor areas.

In an example embodiment of the invention, an apparatus comprises:

at least one processor;

at least one memory including computer program code;

the at least one memory and the computer program code configured to, with the at least one processor, cause the apparatus at least to:

receive a fingerprint data structure of a radiomap representing one or more floor areas in an enclosed space, from a mobile wireless device, the fingerprint data structure including observation elements representing radio measurements at mapped grid nodes of one or more floor areas, and combine the received radiomap with radiomaps of the one or more floor areas, received from other mobile wireless devices.

In an example embodiment of the invention, an apparatus comprises:

wherein the received radiomap and the radiomaps received from other mobile wireless devices, represent floor areas in two or more stories of a multistory building.

In an example embodiment of the invention, an apparatus comprises:

wherein the observation elements represent radio measurements that are of at least one of MAC addresses, received signal strength indication (RSSI), radio frequency (F), electromagnetic field strength, and electromagnetic radiation intensity and power.

In an example embodiment of the invention, an apparatus comprises:

the at least one memory and the computer program code configured to, with the at least one processor, cause the apparatus at least to:

receive a request from a mobile wireless device for a fingerprint data structure of a radiomap of representing floor areas in two or more stories of a multistory building; and transmit to the mobile wireless device information representing a fingerprint data structure of a radiomap representing the requested floor areas, which is a representation of a combination of two or more radiomaps from other mobile wireless devices.

In an example embodiment of the invention, a computer program product comprising computer executable program code recorded on a computer readable non-transitory storage medium, the computer executable program code comprising:

code for generating in a mobile wireless device, grid nodes representing one or more floor areas in an enclosed space, based on a map of the enclosed space;

code for estimating in the mobile wireless device, locations along a path of motion of a user of the mobile wireless device traversing the one or more floor areas, based on motion observations made by a motion sensor in the mobile wireless device and map information;

code for generating a radiomap of the one or more floor areas by making radio measurements with the mobile wireless device, at the estimated locations along the path of motion, and mapping the measurements to the generated grid nodes that are closest to the estimated locations; and code for compiling in the mobile wireless device, a fingerprint data structure of the radiomap, including observation elements representing the radio measurements at the mapped grid nodes.

In an example embodiment of the invention, a computer program product comprising computer executable program code recorded on a computer readable non-transitory storage medium, the computer executable program code comprising:

code for receiving at a server, a fingerprint data structure of a radiomap representing one or more floor areas in an enclosed space, from a mobile wireless device, the fingerprint data structure including observation elements representing radio measurements at mapped grid nodes of one or more floor areas, and code for combining at the server, the received radiomap with radiomaps of the one or more floor areas, received from other mobile wireless devices.

The example embodiments of the invention provide wireless position determination.

DESCRIPTION OF THE FIGURES

FIG. 1E illustrates an alternate example embodiment of the invention, depicting an example network diagram showing a secure cellular telephone link between the global server and the mobile wireless device, conveying from the mobile wireless device to the global server one or more encrypted fingerprint data structures representing a radiomap of floor areas in two or more stories of a multistory building, the figure further showing the global server sending over the secure cellular telephone link to the mobile wireless device, one or more encrypted representations of crowd-sourced fingerprint data structures, in accordance with at least one embodiment of the present invention.

FIG. 2A illustrates an example embodiment of the invention, depicting an example flow diagram of an example method, from the point of view of the mobile wireless device, in accordance with at least one embodiment of the present invention.

FIG. 2B illustrates an example embodiment of the invention, depicting an example flow diagram of an example method, from the point of view of the global sever and database, in accordance with at least one embodiment of the present invention.

DISCUSSION OF EXAMPLE EMBODIMENTS OF THE INVENTION

Figure 1A:
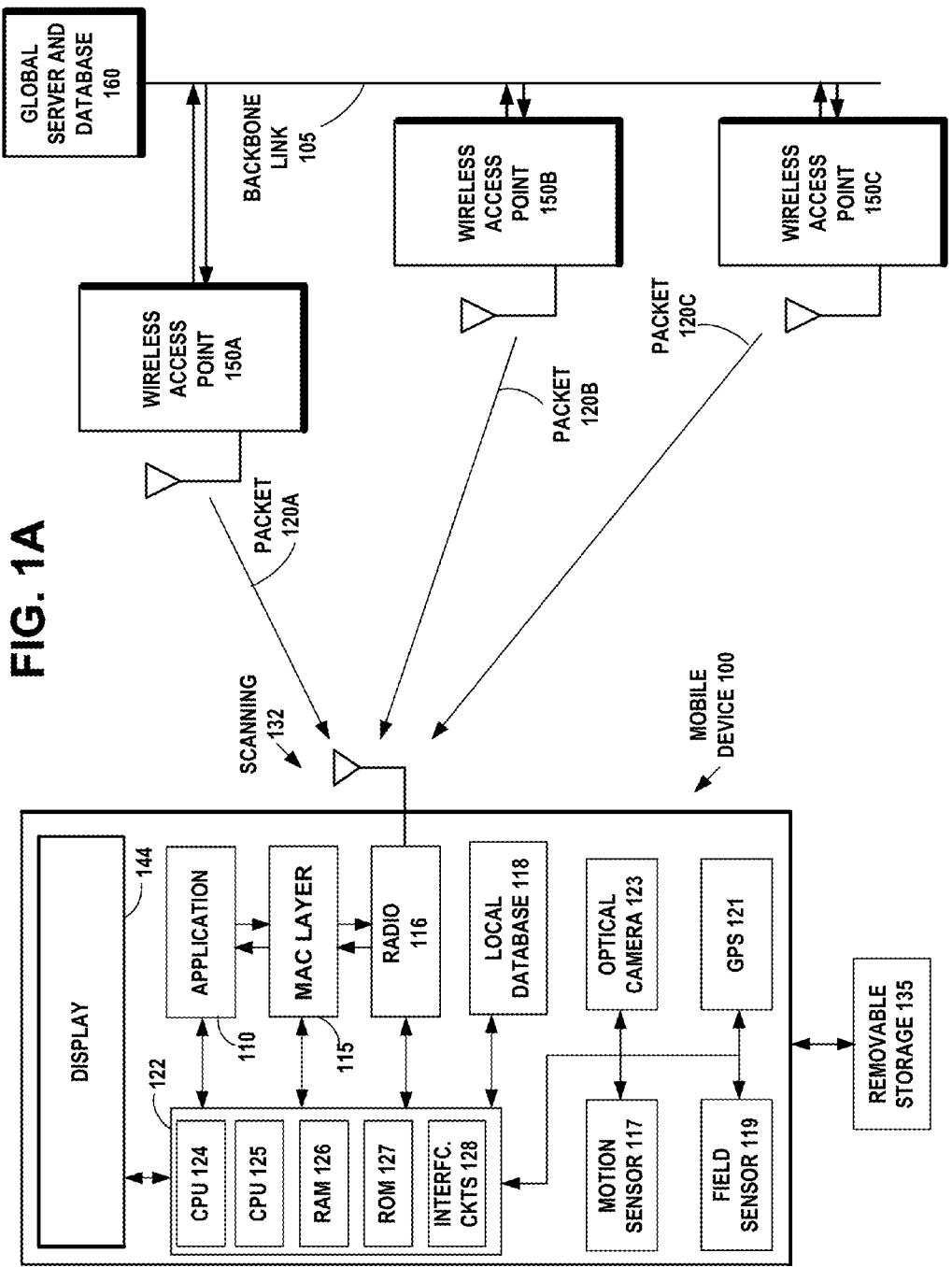
FIG. 1A illustrates an example embodiment of the invention, depicting an example network and architectural diagram showing a mobile wireless device making radio measurements of signals received from three stationary access points, to estimate the device's location along a path of motion traversing floor areas in a multistory building, based on motion observations made by a motion sensor in the device, in accordance with at least one embodiment of the present invention.

Indoor positioning and navigation may be useful applications for smartphones, to support social location-based services and advertisement use cases. In marketing and advertising, data and observations about user locations and activities in malls, shopping centers, airports and the like, may provide useful information for user behavior analysis and other statistical data products derived from crowd-sourced user data. These applications may stimulate further refinements in indoor navigation and positioning accuracy.

In accordance with an example embodiment of the invention, indoor positioning may be applied at least in three-dimensions, including the correct floor in a multistory building. Indoor positioning may also include the fourth dimension of time, to characterize the freshness of the positioning data for applications requiring a rapid navigation or positioning assessment, such as during rush hours.

In accordance with an example embodiment of the invention, three dimensional positioning data, such as radio signal measurements, are compiled in a fingerprint data structure of observation elements mapped to grid nodes that are referenced with respect to global coordinates. The grid nodes may be dynamically generated in real time or they may be preexisting grid templates.

In accordance with an example embodiment of the invention, grid nodes may be dynamically generated by a mobile wireless device, representing one or more floor areas in an enclosed space, based on a map of the enclosed space.

In accordance with an example embodiment of the invention, locations may be estimated along a path of motion of a user of the mobile wireless device traversing the one or more floor areas, based on motion observations made by a motion sensor in the apparatus and a map of the enclosed space. Sensor-based positioning systems typically fuse the sensor data with the map data.

In accordance with an example embodiment of the invention, a radiomap may be generated by the mobile wireless device, representing the one or more floor areas, by making radio measurements at the estimated locations along the path of motion, and mapping the measurements to grid nodes that are closest to the estimated locations.

In accordance with an example embodiment of the invention, a fingerprint data structure of the radiomap may be compiled by the mobile wireless device, including observation elements representing the radio measurements at the mapped grid nodes.

In accordance with an example embodiment of the invention, the mobile wireless device may improve the accuracy of the radiomap when the user repeats traversing the one or more floor areas, by repeating the radio measurements at the estimated repeated locations along the repeated path of motion, mapping the repeated measurements to grid nodes that are closest to the estimated repeated locations, and combining the repeated measurements with the measurements represented by the observation elements of the fingerprint data structure of the radiomap, to obtain a refined radiomap of the one or more floor areas.

In accordance with an example embodiment of the invention, then mobile wireless device may transmit the fingerprint data structure of the radiomap to a global server for combining at the server with radiomaps of the one or more floor areas, from other mobile wireless devices.

In accordance with an example embodiment of the invention, the global server may receive from the mobile wireless device, the fingerprint data structure of the radiomap representing the one or more floor areas, and combine the received radiomap with radiomaps of the one or more floor areas, received from other mobile wireless devices.

In accordance with an example embodiment of the invention, the global server may receive fingerprint data structures of the radiomap representing the one or more floor areas, from many mobile wireless devices as crowd-sourcing data and merge the observation elements of the fingerprint data structures of the radiomap, to obtain a refined radiomap of the one or more floor areas.

In accordance with an example embodiment of the invention, the crowd-sourcing process is the measurement by many mobile wireless devices, of the radio environment at a location, which are combined at the global server. A single mobile wireless device may generate a fingerprint representation of its measurements at the location, which may include the device's observed radio measurements, other types of its measurements at the location, such as magnetic fields, light levels, and the like, plus the location of the device and a timestamp of its measurement. In crowd-sourcing, a fingerprint is generated by the global server of the combined measurements received from many mobile wireless devices, measuring the radio environment at the location, plus the location and timestamps of the measurements.

In accordance with an example embodiment of the invention, the global server may receive a request from the mobile wireless device, for a fingerprint data structure of a radiomap representing floor areas in two or more stories of a multistory building, and transmit to the mobile wireless device a fingerprint data structure of a radiomap representing the requested floor areas, which is a combination of two or more radiomaps from other mobile wireless devices.

In accordance with an example embodiment of the invention, the fingerprint data structure transmitted by the server to the mobile wireless device may be in a different form or data type than the fingerprint data structure received from the mobile wireless device. For example, "raw" fingerprint data in a grid, may take up significant storage space and it may not be feasible to transmit a large quantity of data to the mobile wireless device. In example embodiments of the invention, the fingerprint data structure transmitted by the server may be represented by refined models, such as coverage area models or path-loss models that model the radio environment. The fingerprint data structure transmitted by the server may be represented by at least one of a fingerprint data structure or models of a radiomap representing the floor areas.

In an example embodiment of the invention, a mobile wireless device includes ambient condition sensors, programmed computer processors and a database to accumulate information characterizing locations along a paths traveled by its user within physically constrained spaces, such as buildings, to enable the device to learn the relationships between the sensed ambient conditions and their associated locations where sensed, by repeated transits of those locations.

In an example embodiment of the invention, a mobile wireless device may communicate to a centralized, programmed server and database, the accumulated information characterizing locations along a paths traveled by its user within physically constrained spaces, such as buildings, wherein the server may combine the user's accumulated information with the accumulated information from other users' mobile wireless devices, who have visited the same locations, referred to herein as crowd-sourcing, to further facilitate learning the relationships between the sensed ambient conditions and their associated locations where sensed, by repeated transits of those locations, thereby increasing the confidence in the learned relationships.

In an example embodiment of the invention, a mobile wireless device may access the centralized, programmed server and database to download the learned relationships between the sensed ambient conditions and their associated locations where sensed, to assist its user in determining his/her location.

In accordance with an example embodiment of the invention, the global server may manage crowd-sourced data for three-dimensional indoor positioning by avoiding opportunistically and aggressively collecting all data samples from the mobile wireless devices to generate a composite indoor radiomap. Instead, it is the mobile wireless device that relates its radio measurements to existing indoor maps, using grid nodes referenced with respect to global coordinates. And it is the mobile wireless device that generates fingerprint data structure of observation elements mapped to the grid nodes. Only after having estimated the location where the measurements were taken, does the mobile wireless device upload the generated fingerprint data structure to the global server.

FIG. 1A illustrates an example embodiment of the invention, depicting an example network and architectural diagram showing a mobile wireless device 100 making radio measurements of signals 120A, 120B, and 120C received from three stationary access points 150A, 150B, and 150C and storing those measurements in the local database 118. The radio measurements may or may not be directly used to estimate the device 100's location along a path of motion traversing floor areas in a multistory building. Other observations, for example motion observations made by a motion sensor 117 in the device 100, may be used to estimate the device's location, in accordance with at least one embodiment of the present invention. Mobile wireless device 100 includes a local database 118 for storing the scanned signals from the access points 150A, 150B, and 150C. The signals may be WLAN probe or beacon packets 120A, 120B, and 120C including identification information of the other wireless devices, such as their MAC addresses. The signals 120A, 120B, and 120C may also be characterized by their received signal strength indication (RSSI), an indication of the power level being received by the antenna.

Received Signal Strength Indicator (RSSI) is a useful parameter to use in beacon based localization of sensor nodes. Typically RSSI is a measure of RF energy in dBm, which is ten times the logarithm of the ratio of the power (P) at the receiving end and the reference power (Pref). Power at the receiving end is inversely proportional to the square of distance. For example, the RSSI may be referenced to a Pref of 1 mW (dBm). Hence RSSI may be used as an indicator of the distance at which the sending node is located from the receiving node. When data from many such neighboring nodes are combined, the location of the sending node may be judged with reasonable accuracy.

The signals 120A, 120B, and 120C may also be characterized by their frequency (F) or other physical or informational attributes. The signals 120A, 120B, and 120C may be scanned during sampling intervals while the user traverses a path of motion over one or more floor areas of a multistory building. As an example, a sampling interval may be conducted periodically every few seconds in the background as an ongoing process while other processes may be running on the wireless device 100. Each sampling interval may be time stamped. During a sampling interval, each of the signals 120A, 120B, and 120C may be measured. The measurements may include the signal's MAC address, received signal strength indication (RSSI), frequency (F) or other physical and/or informational attributes. The measurements may be recorded and time stamped and stored in the database 118 as an observation element. The estimated location may be the three-dimensional location of the measurement. The observation elements generated along the path of motion are compiled by the mobile wireless device 100 in a fingerprint data structure of observation elements mapped to a grid nodes that are referenced with respect to global coordinates.

In accordance with an example embodiment of the invention, the mobile wireless device 100 may always be location aware, so that it may detect when the device is entering a building, leaving the building or changing the floor inside the building. Building entry or exit may be done with rather coarse location information. Floor detection and floor change may be detected with motion sensor 117 or with a local radiomap that has been, at least on some level, mapped or linked to the respective indoor map. Location information may be obtained in real-time from WiFi/Cell-ID/Bluetooth radio measurements using the radio 116, and/or from GPS or Global Navigation Satellite System (GNSS) signals using the GPS module 121, and/or from sensing ambient magnetic or electric fields using the field sensor 119, and/or from sensing the ambient light level using the optical camera 123, and/or from sensing motion using the motion sensor 117.

In accordance with an example embodiment of the invention, the mobile wireless device 100 of FIG. 1A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 135 and in FIG. 5, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

In accordance with an example embodiment of the invention, wireless local area networks (WLANs) are an example environment that may be used in the example embodiments of the invention. However, example embodiments of the invention are applicable to other environments as well, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Fixed Access (BWA) (LMDS, WiMAX, AIDAAS and HiperMAN), or the likenetworks, as well as short range networks such as Bluetooth, Zigbee, IEEE 802.11, Digital Enhanced Cordless Telecommunications (DECT), Hiper- LAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN. WLAN discovery mechanisms include passive and active scanning. A device or station that uses the discovery mechanisms is said to be in discovery state. In the passive scanning mode, a device or station in the discovery state listens to a channel for no longer than an interval determined for the scan. In practice, the passively scanning device looks for beacon frames from any wireless networks or representatives of wireless networks or alternatively beacon frames that meet a given criterion, such as a device address or network ID. When a device in the discovery state uses the active scanning, it generates probe request frames and transmits them to request APs to reply with probe response frames, as discovery responses, providing requested information.

In accordance with an example embodiment of the invention, the mobile wireless device 100 may be, for example, a miniature device such as a key fob, smart card, jewelry, or the like. The mobile wireless device 100 may be, for example, a larger device such as a cell phone, smart phone, flip-phone, PDA, graphic pad, or even larger devices such as a laptop computer, an automobile dashboard, and the like.

Figure 1B:
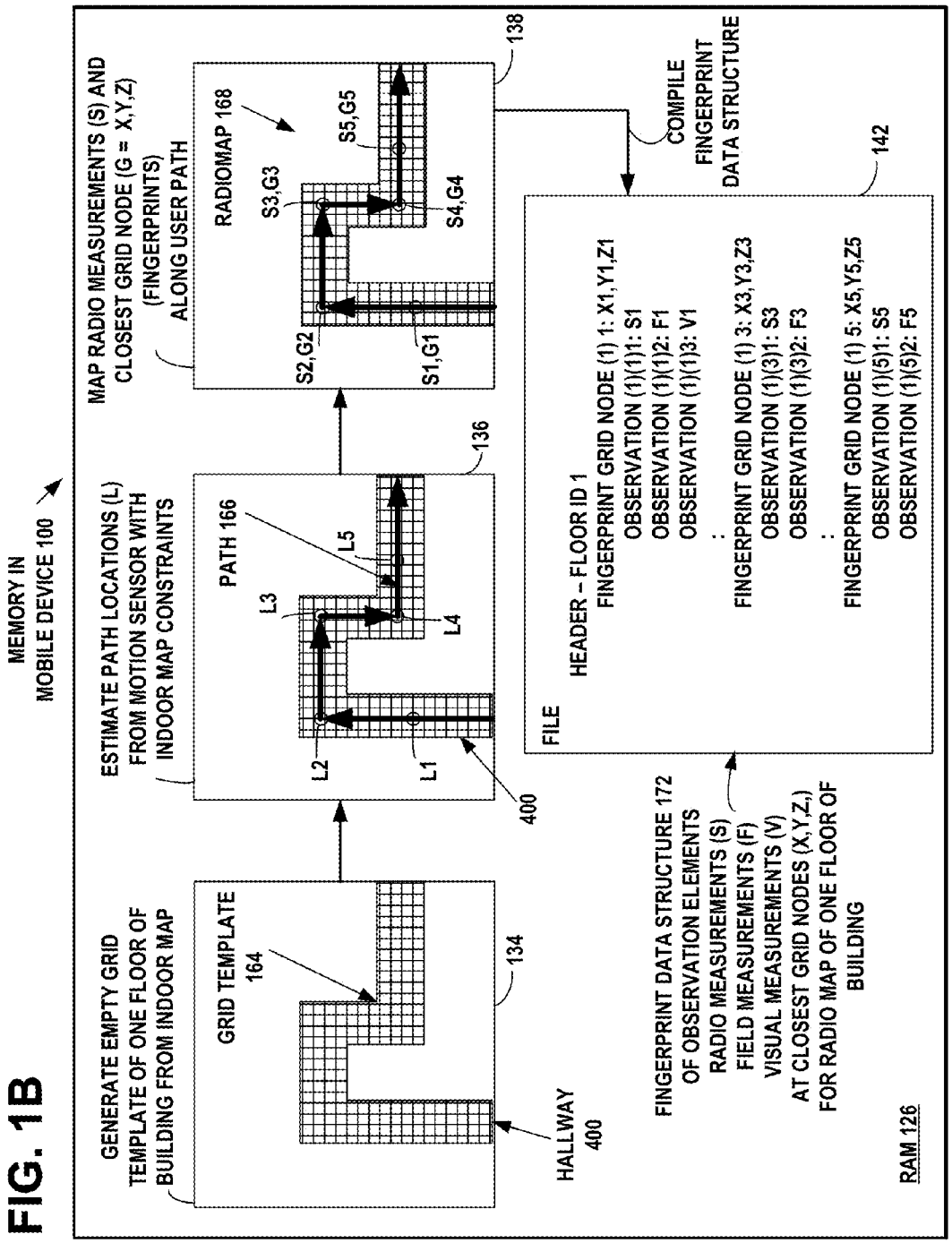
FIG. 1B illustrates an example embodiment of the invention, depicting an example architectural diagram showing a memory of the mobile wireless device of FIG. 1A, including memory partitions to generate under program control, a fingerprint data structure representing a radiomap of a single floor area, by making radio measurements with the device at estimated locations along the path of motion over the floor area and mapping the measurements to grid nodes that are closest to the estimated locations, in accordance with at least one embodiment of the present invention. The grid nodes may be dynamically generated in real time or they may be preexisting grid templates.

FIG. 1B illustrates an example embodiment of the invention, depicting an example architectural diagram showing a memory, for example RAM 126, of the mobile wireless device 100 of FIG. 1A, including memory partitions 134, 136, 138, and 142 to generate under program control, a fingerprint data structure 172 representing a radiomap 168 of a single floor area, by making radio measurements with the device 100 at estimated locations along the path of motion 166 over the floor area and mapping the measurements to grid nodes of a grid template 164 that are closest to the estimated locations, in accordance with at least one embodiment of the present invention. The grid nodes may be dynamically generated in real time or they may be preexisting grid templates.

In accordance with an example embodiment of the invention, the mobile wireless device 100 generates in the memory partition 164, an empty grid template 164 of grid nodes representing one or more floor areas, including hallway 400, in an enclosed space, based on a map of the enclosed space. The grid is fixed to global coordinates, for example having a 0.05 micro-degree resolution. The indoor radio measurements are mapped, for example, to the closest grid node instead of to their measured or estimated coordinates. The grid nodes may be dynamically generated on an as-needed basis that may allow for expansion.

An example of dynamic generation of grid nodes referenced to global coordinates, may make reference to a preexisting map of the hallway 400. The preexisting map may be represented by map data in the local database 118 that specifies the global coordinates of the walls and floor of the hallway 400. The global coordinates may be in units of micro degrees of latitude, micro degrees of longitude, and meters or centimeters of elevation above a datum, such as mean sea level. As the mobile wireless device 100 enters the hallway 400 from outside, it records the global coordinates at the hallway entrance, using the GPS 121. Then, as the mobile wireless device 100 traverses the hallway 400, it estimates path locations L, based on the GPS reading at the entrance, the motion observations made by the motion sensor 117 in the mobile wireless device 100, and the preexisting map of the hallway 400. The preexisting map provides limits in values of global coordinates that may exist within the hallway space.

The estimated path locations L are then mapped dynamically, in real time, to the closest grid nodes of the walls and floor of the hallway 400.

In accordance with an example embodiment of the invention, the mobile wireless device 100 estimates in the memory partition 136, locations along a path of motion 166 of a user of the mobile wireless device traversing the one or more floor areas, including hallway 400, based on motion observations made by a motion sensor 117 in the mobile wireless device 100. User track inside the building is estimated from the sensor measurements and with the indoor map constraints. The motion or position of the user is tracked on the grid. The position may be calculated real-time or it may also be estimated afterwards from the buffered or stored measurements, once a reference location measurement is done, for example, when exiting the building.

In accordance with an example embodiment of the invention, the mobile wireless device 100 generates in the memory partition 138 a radiomap 168 of the one or more floor areas by making radio measurements with the radio 116 of the mobile wireless device, at the estimated locations along the path of motion 166, and mapping the measurements to grid nodes of the grid template 164 that are closest to the estimated locations.

In accordance with an example embodiment of the invention, the mobile wireless device 100 compiles in the memory partition 142, a fingerprint data structure 172 of the radiomap 168, including observation elements representing the radio measurements at the mapped grid nodes.

In accordance with an example embodiment of the invention, the fingerprint data structure 172 may be organized with the following file format shown in Table 1:

TABLE 1

FILE
    Header - FLOOR ID 1
        Fingerprint GRID NODE (1) 1: X1,Y1,Z1
            OBSERVATION (1)(1)1: S1
            OBSERVATION (1)(1)2: F1
            OBSERVATION (1)(1)3: V1
            :
        Fingerprint GRID NODE (1) 3: X3,Y3,Z3
            OBSERVATION (1)(3)1: S3
            OBSERVATION (1)(3)2: F3
            :
        Fingerprint GRID NODE (1) 5: X5,Y5,Z5
            OBSERVATION (1)(5)1: S5
            OBSERVATION (1)(5)2: F5

The estimated path locations L determined from the motion sensor 117, are approximated by the X, Y, Z global coordinates of the closest grid node G, for example X1, Y1, Z1, and are expressed in the fingerprint identification line "Fingerprint GRID NODE (1) 1: X1, Y1, Z1". The representation of the grid nodes may be presented in a data compacted format, for example, table indices, run-length encoding or the like, as well as directly in global X, Y, Z grid units.

The radio measurement (S) made by radio 116 at the estimated path location L1, for example radio measurement S1, is mapped to the closest grid node X1, Y1, Z1, and is expressed in the observation line "OBSERVATION (1)(1)1: S1".

The field measurements (F), such as magnetic field measurements, made by field sensor 119 at the estimated path location L1, for example radio measurement F1, is mapped to the closest grid node X1, Y1, Z1, and is expressed in the observation line "OBSERVATION (1)(1)2: F1".

The visual measurements (V), such as light level, made by optical camera 123, at the estimated path location L1, for example visual measurement V1, is mapped to the closest grid node X1,Y1,Z1, and is expressed in the observation line "OBSERVATION (1)(1)3: V1".

In accordance with an example embodiment of the invention, the mobile wireless device 100 may not return fingerprints to the global server 160 without location information. In accordance with an example embodiment of the invention, the fingerprints in the grid may be sparse so that there may be gaps or holes in the observations. In accordance with an example embodiment of the invention, one grid node may have measurements from multiple time instances if the user has moved many times, for example via the same corridor or passage on the building or has been in the same room for a while. If the measurements of the observable are scalar values taken at the same location, they may be added and the resultant sum may be attributed as the combined measurement of the observable at that location.

In accordance with an example embodiment of the invention, location information may be calculated backwards from the buffered motion sensor 117 measurements, once the user has left the building and an accurate GPS location may be obtained again. The motion sensor measurements may be stored in the memory 126 or local database 118 of the device 100. In accordance with an example embodiment of the invention, if the user has been in the same building before, the device 100 may already have a radiomap grid 168 in its memory 126 or database 118, which may be used for positioning. In this case it may also be possible to enhance the existing radiomap 168. In accordance with an example embodiment of the invention, location information may be obtained from the indoor map matching. Even though an exact location of the device 100 may not be known in the beginning, it may be possible to solve the location by matching the location history of the path 166 to the indoor map. Once the path 166 is long enough, the matching of the path 166 to the indoor map may become unambiguous, since the movement along the path 166 can happen only via doors, passages, elevators, stairs etc.

Indoor maps display features that are meaningful to the user interface of the device 100, for example, enhancing the presentation of a map that reflects the current position of the device 100. Indoor map data is directed to improved location visualization, for example, displaying building maps and their interiors to users, routing information for the navigation, and the like.

In accordance with an example embodiment of the invention, grid templates 164 may be created from the indoor maps by spanning the valid area with a fixed-resolution grid. Grid nodes outside the building or invalid area are not allocated with radio measurements or location information. In accordance with an example embodiment of the invention, fingerprints or radio measurements may be allocated only to the grid nodes. If the location of the fingerprint falls between nodes, then the grid node closest to the fingerprint is given the measurement. In accordance with an example embodiment of the invention, the measurement may be given to k-nearest neighbors grid nodes. In accordance with an example embodiment of the invention, if there are several measurements to the same grid node, the measurements in that node may be averaged or filtered or replaced with the latest measurement.

In accordance with an embodiment of the invention, fingerprint for a location may include information pertaining to the location captured at multiple instances in time. The mobile wireless device 100 may sense information each of the instances in time, may correlate the information and then may store in the information in association with previous instances. Sensed information may include information captured regarding motion, direction, acceleration, of the mobile wireless device 100. Location-related information may include signal, field, or visual measurements captured at a location. Information sensing may be triggered in the mobile wireless device 100 in accordance with periodic timing, a change in sensed information, or through manual intervention, and as a result sensors in the device 100 may sense and record information at the current instance in time.

Figure 1C:
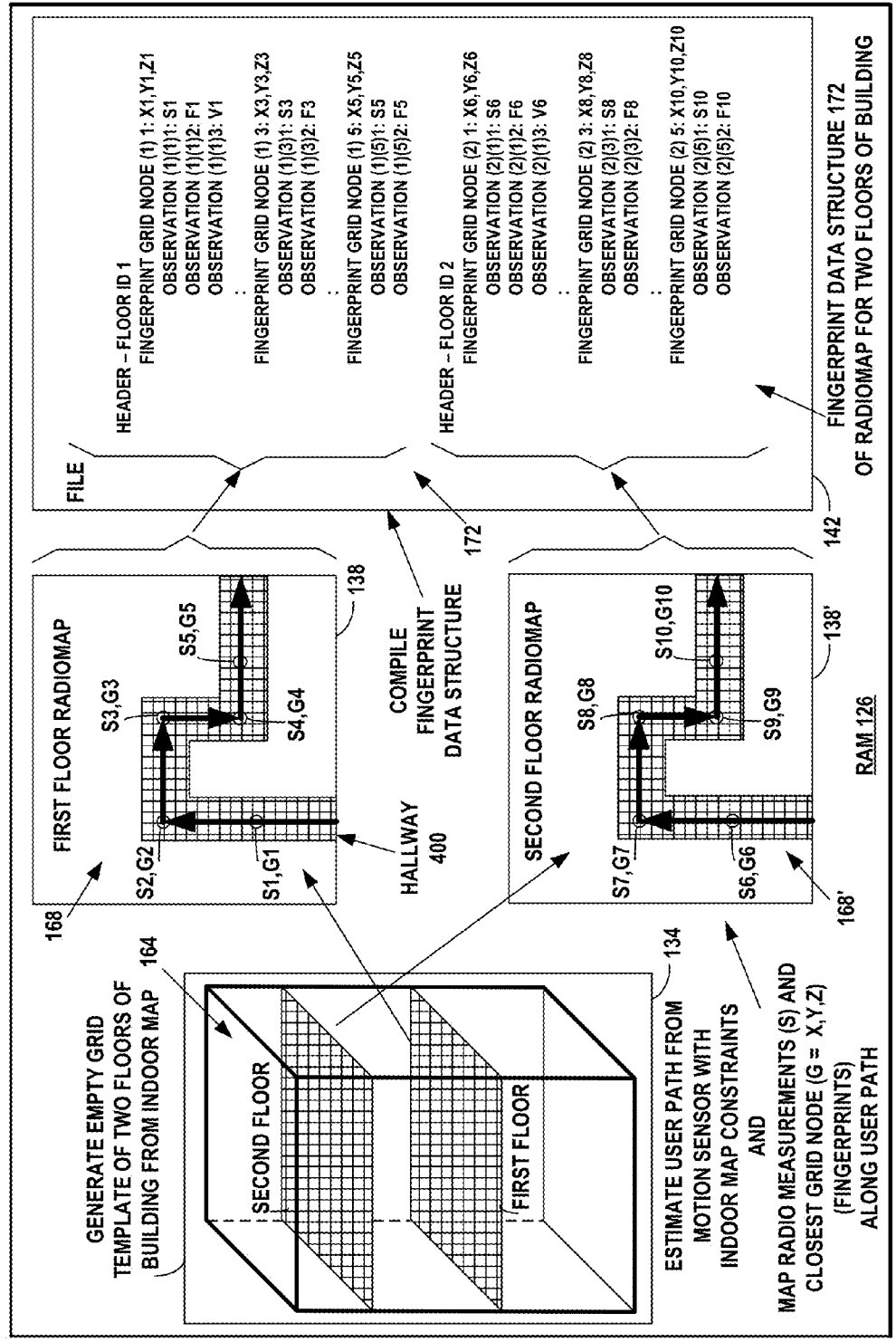
FIG. 1C illustrates an example embodiment of the invention, depicting an example architectural diagram showing a memory of the mobile wireless device of FIG. 1A, including memory partitions to generate under program control, a fingerprint data structure representing a radiomap of two floor areas in two stories of a multistory building, by making radio measurements with the device at estimated locations along the path of motion over the two floor areas and mapping the measurements to grid nodes that are closest to the estimated locations, in accordance with at least one embodiment of the present invention.

FIG. 1C illustrates an example embodiment of the invention, depicting an example architectural diagram showing a memory, for example RAM 126, of the mobile wireless device 100 of FIG. 1A, including memory partitions 134, 136, 138, and 142 to generate under program control, a fingerprint data structure 172 representing a radiomap 168 and 168' of two floor areas, including hallway 400, in two stories of a multistory building, by making radio measurements with the device 100 at estimated locations along the path of motion over the two floor areas and mapping the measurements to grid nodes of a grid template 164 that are closest to the estimated locations, in accordance with at least one embodiment of the present invention.

In accordance with an example embodiment of the invention, the mobile wireless device 100 generates in the memory partition 164, an empty grid template 164 of grid nodes representing two or more floor areas in an enclosed space, based on a map of the enclosed space.

In accordance with an example embodiment of the invention, the mobile wireless device 100 estimates locations along a path of motion of a user of the mobile wireless device traversing the two or more floor areas, based on motion observations made by a motion sensor 117 in the mobile wireless device 100. The mobile wireless device 100 may also take into account earlier collected radiomap information.

In accordance with an example embodiment of the invention, the mobile wireless device 100 generates in the memory partition 138 a radiomap 168 and 168' of the one or more floor areas by making radio measurements with the radio 116 of the mobile wireless device, at the estimated locations along the path of motion, and mapping the measurements to grid nodes of the grid template 164 that are closest to the estimated locations.

In accordance with an example embodiment of the invention, the mobile wireless device 100 compiles in the memory partition 142, a fingerprint data structure 172 of the radiomap 168 and 168', including observation elements representing the radio measurements at the mapped grid nodes.

In accordance with an example embodiment of the invention, the fingerprint data structure 172 representing two floors of a multistory building, may be organized with the following file format shown in Table 2:

TABLE 2

FILE
    Header - FLOOR ID 1
        Fingerprint GRID NODE (1) 1: X1,Y1,Z1
            OBSERVATION (1)(1)1: S1
            OBSERVATION (1)(1)2: F1
            OBSERVATION (1)(1)3: V1
            :
        Fingerprint GRID NODE (1) 3: X3,Y3,Z3
            OBSERVATION (1)(3)1: S3
            OBSERVATION (1)(3)2: F3
            :
        Fingerprint GRID NODE (1) 5: X5,Y5,Z5
            OBSERVATION (1)(5)1: S5
            OBSERVATION (1)(5)2: F5

TABLE 2-continued

```
Header - FLOOR ID 2
    Fingerprint GRID NODE (2) 1: X6,Y6,Z6
        OBSERVATION (2)(1)1: S6
        OBSERVATION (2)(1)2: F6
        OBSERVATION (2)(1)3: V6
        :
    Fingerprint GRID NODE (2) 3: X8,Y8,Z8
        OBSERVATION (2)(3)1: S8
        OBSERVATION (2)(3)2: F8
        :
    Fingerprint GRID NODE (2) 5: X10,Y10,Z10
        OBSERVATION (2)(5)1: S10
        OBSERVATION (2)(5)2: F10
```

The estimated path locations L determined from the motion sensor 117 over two floors of a multistory building, are approximated by the X, Y, Z global coordinates of the closest grid node G, for example X1, Y1, Z1, and are expressed in the fingerprint identification line "Fingerprint GRID NODE (1) 1: X1, Y1, Z1". The first floor radiomap is represented by the portion of the file under "Header—FLOOR ID 1" in the fingerprint data structure 172. The second floor radiomap is represented by the portion of the file under "Header—FLOOR ID 2" in the fingerprint data structure 172. The representation of the grid nodes may be presented in a data compacted format, for example, table indices, run-length encoding or the like, as well as directly in global X, Y, Z grid units.

The radio measurement (S) made by radio 116 at the estimated path location L1, for example radio measurement S1, is mapped to the closest grid node X1, Y1, Z1, and is expressed in the observation line "OBSERVATION (1)(1)1: S1".

The field measurements (F), such as magnetic field measurements, made by field sensor 119 at the estimated path location L1, for example radio measurement F1, is mapped to the closest grid node X1, Y1, Z1, and is expressed in the observation line "OBSERVATION (1)(1)2: F1".

The visual measurements (V), such as light level, made by optical camera 123, at the estimated path location L1, for example visual measurement V1, is mapped to the closest grid node X1, Y1, Z1, and is expressed in the observation line "OBSERVATION (1)(1)3: V1".

In accordance with an example embodiment of the invention, the crowd-sourced fingerprints may be mapped on synthetic three-dimensional grids, and each grid may span one floor or altitude or level and may have a resolution that is a multiple of a fixed global grid. In accordance with an example embodiment of the invention, the device 100 may use the existing local three-dimensional fingerprint 172 for positioning and/or enhancing the location information of the fingerprints. Crowd-sourced information may include, for example, location-related information that is collected by users and that is voluntarily provided for positioning or mapping purposes.

Figure 1D:
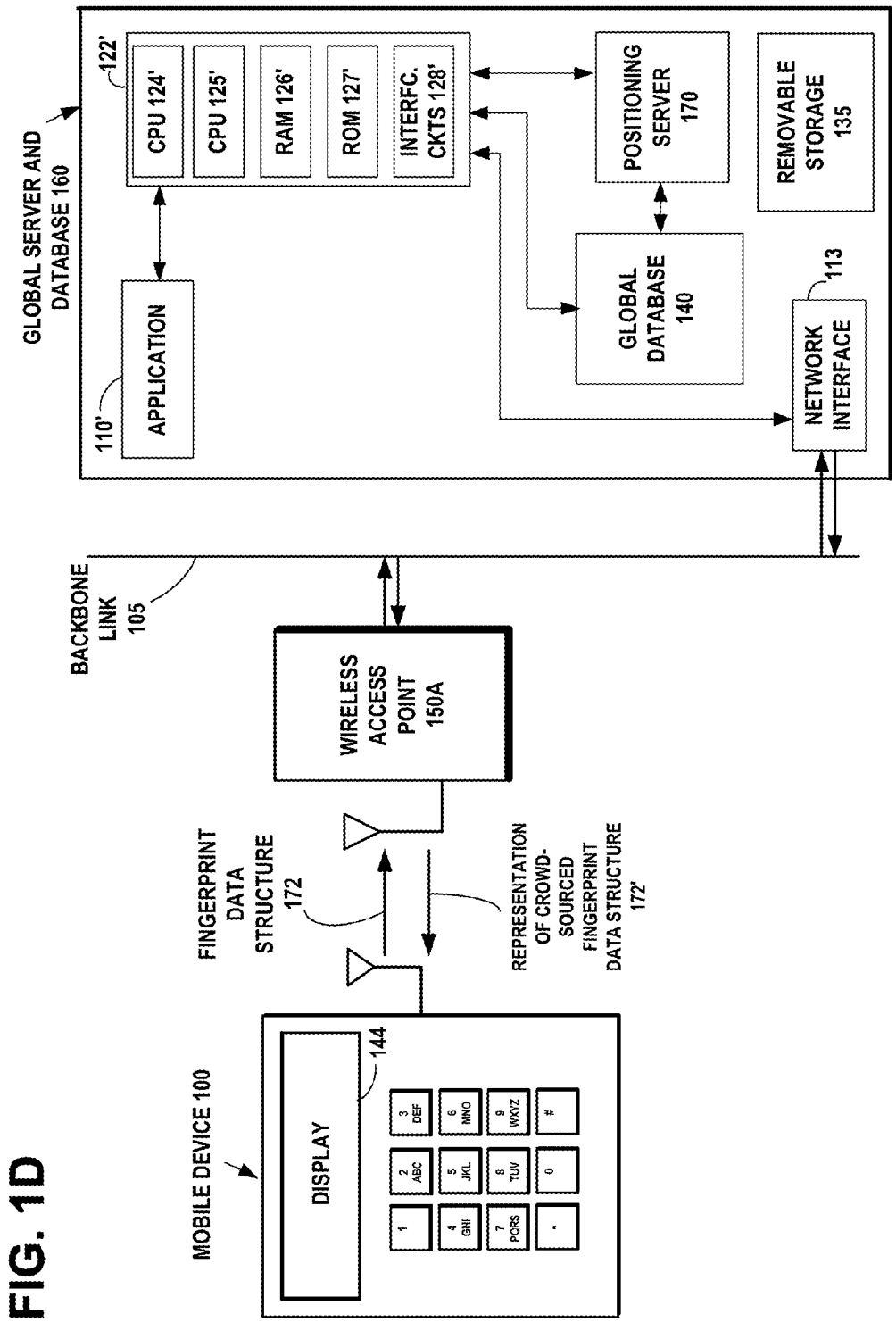
FIG. 1D illustrates an example embodiment of the invention, depicting an example network diagram showing a global server receiving a fingerprint data structure representing a radiomap of floor areas in two or more stories of a multistory building, received from a mobile wireless device, for combining at the server the radiomap with other radiomaps of the floor areas, received from other mobile wireless devices, in accordance with at least one embodiment of the present invention.

FIG. 1D illustrates an example embodiment of the invention, depicting an example network diagram showing a global server 160 receiving a fingerprint data structure 172 representing a radiomap 168 of floor areas in two or more stories of a multistory building, received from the mobile wireless device 100, for combining at the server 160 the radiomap 168 with other radiomaps of the floor areas, received from other mobile wireless devices, to generate a representation of a crowd-sourced fingerprint data structure 172' for storage in the global database 140, in accordance with at least one embodiment of the present invention. The representation of the grid nodes may be presented in a data compacted format, for example, table indices, run-length encoding or the like, as well as directly in global X, Y, Z grid units.

In an example embodiment of the invention, the positioning server and database 160 of FIG. 1D includes processor 122' that may access random access memory RAM 126' and/or read only memory ROM 127' in order to obtain stored program code and data for use during processing. RAM 126' or ROM 127' may generally include removable or imbedded memories that operate in a static or dynamic mode. Further, RAM 126' or ROM 127' may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 135 and in FIG. 5, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

In accordance with an example embodiment of the invention, the global server 160 receives a fingerprint data structure 172 of a radiomap 168 representing one or more floor areas in an enclosed space, from the mobile wireless device 100. The fingerprint data structure 172 includes observation elements representing radio measurements at mapped grid nodes 168 of one or more floor areas. In accordance with an example embodiment of the invention, the global server 160 combines the received radiomap 168 with radiomaps of the one or more floor areas, received from other mobile wireless devices to generate a crowd-sourced radiomap. The observation elements of the fingerprint data structure 172 are respectively combined with the observation elements of the radiomaps received from the other mobile wireless devices, to generate a crowd-sourced fingerprint data structure 172' representing the crowd-sourced radiomap. The crowd-sourced fingerprint data structure 172' representing the crowd-sourced radiomap may be stored in the global database 140. The database 140 may also be partitioned into a plurality of geographically distributed servers based in several countries. The database 140 may be running on a different server (virtual or physical) than the actual positioning server 170. In response to a request for location information received from the wireless device 100, the positioning server 170 of the global server 160 will respond and transmit the crowd-sourced fingerprint data structure 172' to the mobile wireless device 100.

The crowd-sourced fingerprint data structure 172' transmitted to the mobile wireless device 100 may be in a different form or data type than the fingerprint data structure 172 received from the mobile wireless device 100. For example, "raw" fingerprint data in a grid, may take up significant storage space and it may not be feasible to transmit a large quantity of data to the mobile wireless device 100. In example embodiments of the invention, the crowd-sourced fingerprint data structure 172' may be represented by refined models, such as coverage area models or path-loss models that model the radio environment. In example embodiments of the invention, the crowd-sourced fingerprint data structure 172' may include pointers to pre-established coverage area models or path-loss models stored in the local database 118 of the mobile wireless device 100. The fingerprint data structure transmitted by the server may be represented by at least one of a fingerprint data structure or models of a radiomap representing the floor areas.

In accordance with an example embodiment of the invention, the observation elements represent radio measurements that are of at least one of MAC addresses, received signal strength indication (RSSI), radio frequency (F), electromagnetic field strength, and electromagnetic radiation intensity and power. Typically RSSI is a measure of RF energy in dBm, which is ten times the logarithm of the ratio of the power (P) at the receiving end and the reference power (Pref). Power at the receiving end is inversely proportional to the square of distance. For example, the RSSI may be referenced to a Pref of 1 mW (dBm).

Electromagnetic field strength is measured in terms of volts-per-meter, magnetic field in terms of Amperes-per-meter, and intensity is power-per-unit area.

In accordance with an example embodiment of the invention, the crowd-sourced indoor fingerprints 172' include three-dimensional location information. In accordance with an example embodiment of the invention, the fingerprints are reported to the global server 160 by the mobile wireless device 100 once there is an opportunity to do that, for example, via a free WiFi/data connection. In accordance with an example embodiment of the invention, the process of combining the received three-dimensional fingerprints 172 with fingerprint data structures received from other mobile wireless devices is straight forward, since their location information follows the fixed grid spacing and resolution of the grid template 164.

In accordance with an example embodiment of the invention, the device 100 may report the fingerprints to the global server 160 at the earliest opportunity. The contents of the local radiomaps 168 may be reported in an optimal format. Only the measurements or nodes that have new information may be reported. The grid templates 164 may be in three-dimensions, by default. The altitude or floor information may be linked to the corresponding indoor map via an ID, such as a serial number.

In accordance with an example embodiment of the invention, the fingerprint reports from the mobile wireless devices are merged into a global three-dimensional radiomap in the global server 160. The merging may be straightforward since the fingerprints are reported on the fixed grid template 164 so that the location information has a fixed granularity or resolution. The fingerprints that are reported for the same grid node may be combined. The global server 160 server does not need to have access to the indoor maps nor receive any raw location data, such as sensor measurements.

In accordance with an example embodiment of the invention, the reported fingerprints may be combined in the server into one radiomap presenting the radio environment per each floor. The combined radiomap may have the same grid resolution and spacing as the fingerprints. The radiomap may also have the necessary IDs or pointers to link it to the correct tile or section of the indoor map.

FIG. 1E illustrates an alternate example embodiment of the invention, depicting an example network diagram showing a secure cellular telephone link 145S between the global server 160 and the mobile wireless device 100. The mobile wireless device 100 may optionally include an encrypt/decrypt module 130 and a cell phone module 131 for transmitting from the mobile wireless device 100 to the global server 160 one or more encrypted fingerprint data structures 172 representing a radiomap of floor areas in two or more stories of a multistory building. The encrypted fingerprint data structures 172 are transmitted by the cell phone module 131 to the cell phone network 161 and the public switched telephone network (PSTN) 162 to the global server 160. The global server 160 may optionally include an encrypt/decrypt module 163 for receiving and decrypting the one or more encrypted fingerprint data structures 172. FIG. 1E further shows the global server 160 transmitting over the secure cellular telephone link 145S to the mobile wireless device 100, one or more encrypted representations of crowd-sourced fingerprint data structures 172'. The optional encrypt/decrypt module 163 in the global server 160 may encrypt the representations of crowd-sourced fingerprint data structures 172', which are transmitted via the PSTN 162 and the cell phone network 161 to the cell phone module 131 of the mobile wireless device 100, where the optional encrypt/decrypt module 130 may decrypt the encrypted representations of crowd-sourced fingerprint data structures 172', in accordance with at least one embodiment of the present invention. In an example embodiment of the invention, the wireless access points 150A, 150B, and 150C (of FIG. 1A) may be part of a secure closed WiFi network 159 in the building. In the example embodiment of FIG. 1E, the secure cellular telephone link 145S to the global server 160 is not via the same connections as used for scanning by the mobile device 100 in FIG. 1A. In this example embodiment of FIG. 1E, the mobile device 100 may still see the advertisement packets and the connection data from the access points 150A, 150B, and 150C, so that the mobile device 100 may still connect to them, if permitted, and network fingerprints may still be collected, but the connection to the global server 160 and database 140 would have to be from the mobile device 100 via the secure cellular telephone link 145S.

FIG. 2A illustrates an example embodiment of the invention, depicting an example flow diagram 200 of an example method, from the point of view of the mobile wireless device 100, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 202: generating in a mobile wireless device, an empty grid template of grid nodes representing one or more floor areas in an enclosed space, based on a map of the enclosed space;

Step 204: estimating in the mobile wireless device, locations along a path of motion of a user of the mobile wireless device traversing the one or more floor areas, based on motion observations made by a motion sensor in the mobile wireless device and map information;

Step 206: generating a radiomap of the one or more floor areas by making radio measurements with the mobile wireless device, at the estimated locations along the path of motion, and mapping the measurements to the generated grid nodes of the grid template that are closest to the estimated locations; and Step 208: compiling in the mobile wireless device, a fingerprint data structure of the radiomap, including observation elements representing the radio measurements at the mapped grid nodes.

FIG. 2B illustrates an example embodiment of the invention, depicting an example flow diagram 250 of an example method, from the point of view of the global sever and database 160, in accordance with at least one embodiment of the present invention. The steps of the flow diagram represent computer code instructions stored in the RAM and/or ROM memory of the apparatus, which when executed by the central processing units (CPU) 124' and/or 125', carry out the functions of the example embodiments of the invention. The steps may be carried out in another order than shown and individual steps may be combined or separated into component steps. The flow diagram has the following steps:

Step 252: receiving at a server, a fingerprint data structure of a radiomap representing one or more floor areas in an enclosed space, from a mobile wireless device, the fingerprint data structure including observation elements representing radio measurements at mapped grid nodes of one or more floor areas, and Step 254: combining at the server, the received radiomap with radiomaps of the one or more floor areas, received from other mobile wireless devices.

Figure 3:
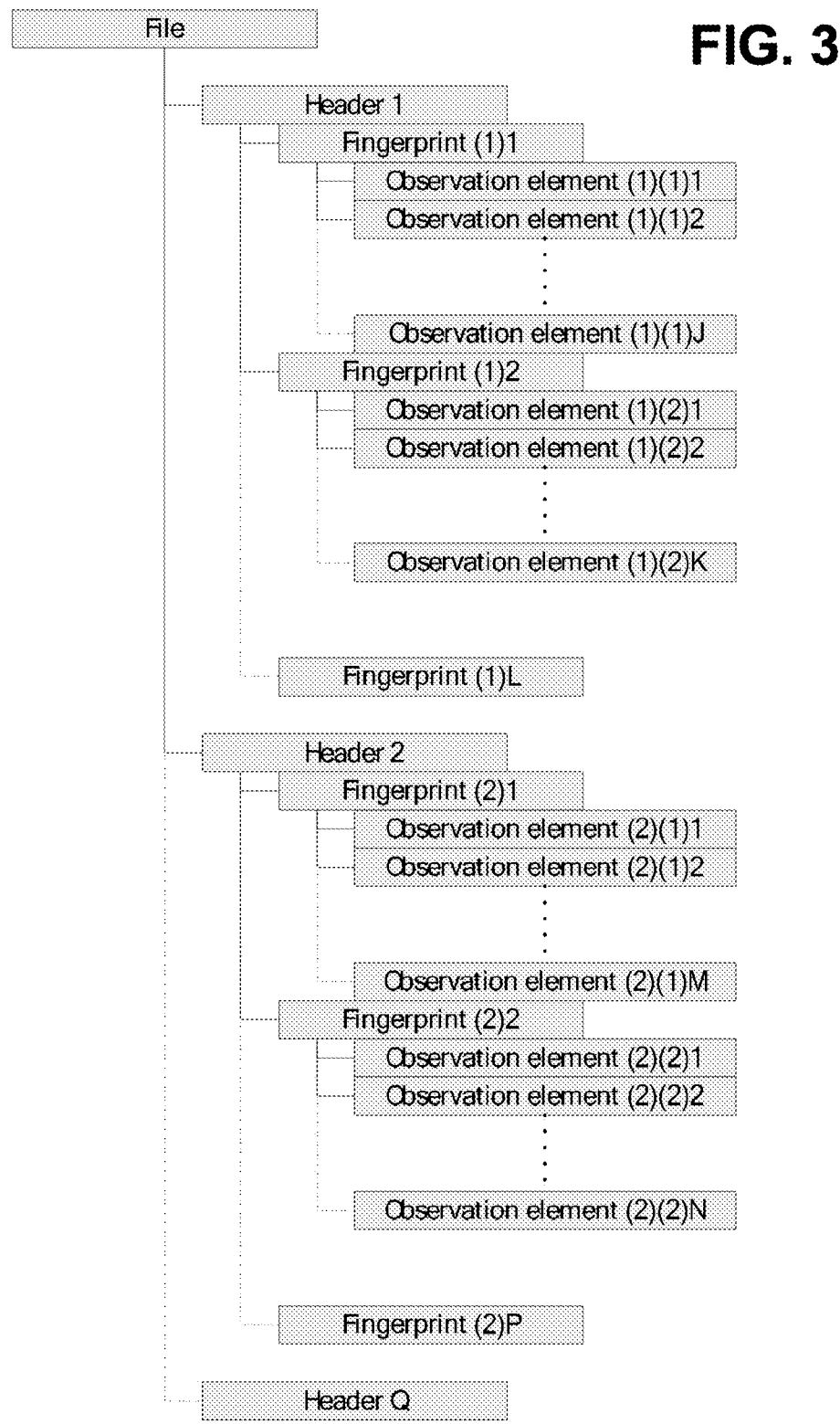
FIG. 3 illustrates an example embodiment of the invention, of a fingerprint data structure, wherein the observation elements contain three-dimensional location information, in accordance with at least one embodiment of the present invention.

FIG. 3 illustrates an example embodiment of the invention, of a fingerprint data structure, wherein the observation elements contain three-dimensional location information, in accordance with at least one embodiment of the invention.

Figure 4:
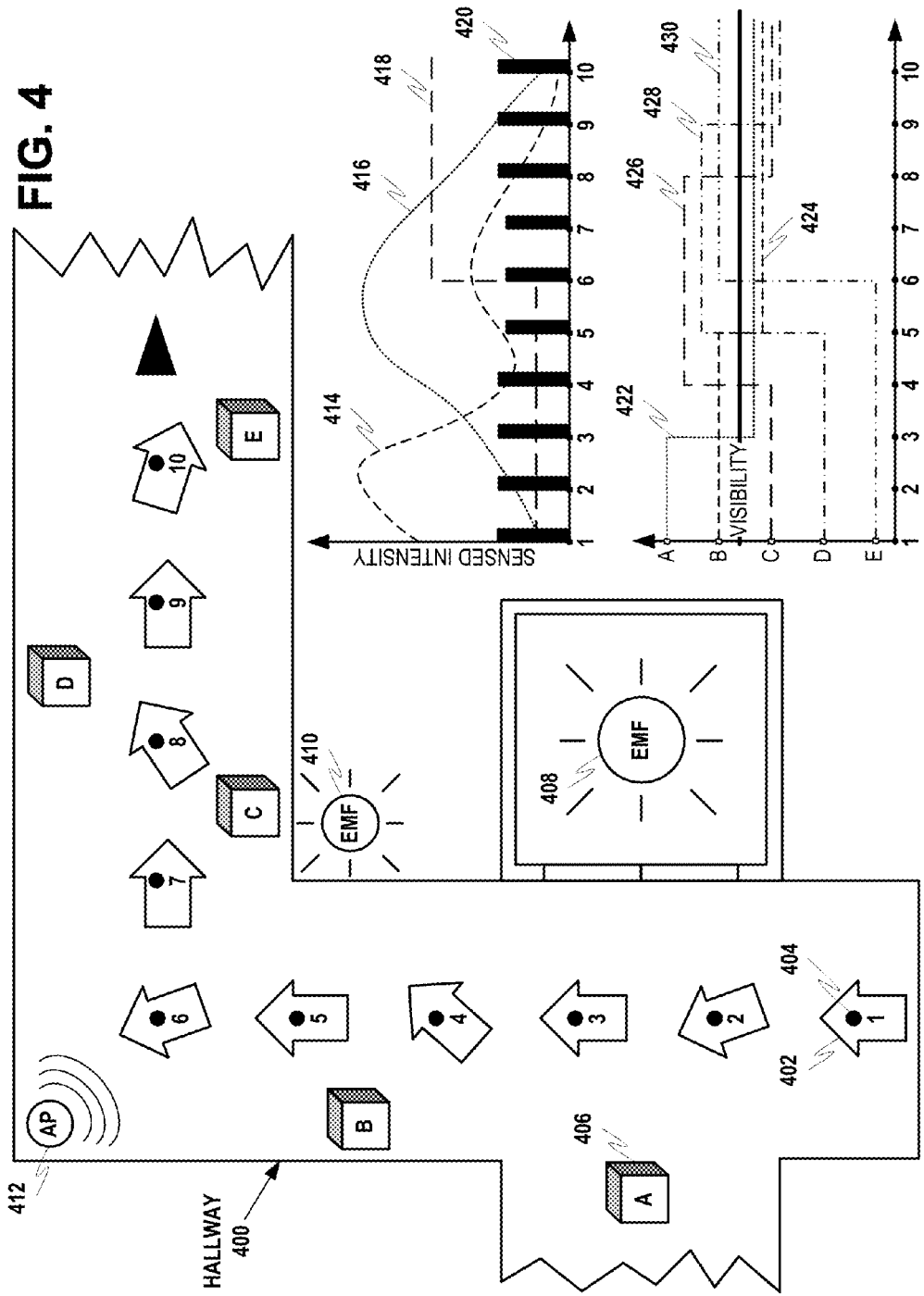
FIG. 4 illustrates an example interior of a building hallway, in accordance with at least one embodiment of the invention.

FIG. 4 illustrates an example interior of a building hallway 400, in accordance with at least one embodiment of the invention. The various embodiments of the invention are not limited specifically to this application, and may be implemented wherever position determination functionality may be needed. Hallway 400 may be traversed by a device 100 moving from one end to the other. For example, a user holding the device 100 may walk along hallway 400. As the device 100 is moved in this manner, at subsequent instances in time activities may be carried out such as information collection, processing and storage in accordance with at least one embodiment of the invention.

In the example of FIG. 4 the device 100 begins at arrow 402 oriented in the direction defined by the arrow. The device 100 is equipped with device-related resources such as motion sensors, acceleration sensors, directional sensors, such as may be provided by the motion sensor 117. The estimated path locations L determined from the motion sensor 117, are approximated by the X, Y, Z global coordinates of the closest grid node G, for example X1, Y1, Z1. As shown in Table 1, above, the coordinates of the closest grid node G are expressed in the fingerprint identification line "Fingerprint GRID NODE (1) 1: X1, Y1, Z1". The device 100 may record some or all of these characteristics at each location in the local database 118.

The movement of the device 100 through hallway 400 may then be characterized in a series of time instances 404 corresponding a time series of grid node coordinates X1, Y1, Z1; . . . ; X3, Y3, Z3; . . . X5, Y5, Z5, in the fingerprints expressed in the fingerprint data structure 172, an example of which is shown in Table 1, above. The fingerprint data structure 172 provides a representation of hallway 400 and/or other internal areas of a structure.

In the example of FIG. 4 there are a total of ten (10) time instances in the example fingerprint data structure 172, but this number may vary depending on factors such as time instance/sensing activity triggering methods, device 100 capabilities, mapping system configuration, etc. Collection activities that may be associated with the creation of time instances may comprise sensing device 100 and/or location information, processing and/or correlating the sensed information, and storing the processed/correlated information as a time instance in a fingerprint data structure 172. Fingerprint data structures 172 may then be associated together in a mapping database based on common attributes/elements.

In accordance with at least one embodiment of the invention, a fingerprint data structure 172 may be composed of multiple instances where information is sensed, and the time at which each instance is sensed may be utilized to scale the information so that it may be combined in the fingerprint data structure 172. The triggering of sensing may occur in various ways. For example, sensing may occur periodically. Periodic operation may provide sensed information that is evenly spaced in time, but that is not evenly spaced in distance within the location because a user may not traverse hallway 400 at a constant pace. Thus, the time information may be utilized to correlate the sensed information so that, for example, the scale may remain constant between time instances in a fingerprint data structure 172. Sensing may also be triggered in other ways, such as based on motion sensed in the device, manually, and the like. Regardless of how sensing is triggered, various sensors may be activated as a result. For example, if sensed motion, acceleration, or change in device 100 orientation is detected, this information may be recorded. If vision sensing resources are available, such as the camera 123, then visual information such as video stream or still image information may be recorded.

If wireless sensing resources are available, signal and/or field information may be sensed at instances in time and added to the fingerprint data structure 172. Wireless sensing may take multiple forms in device 100. Wireless communication resources utilized for transmitting and/or receiving data in the device 100 may also be employed for detecting electromagnetic signals, and information related to any detected wireless signals may be recorded various instances in time. For example, not only may access points (AP) 150A, 150B, and 150C in the location be identified in the course of normal wireless operation, but the strength of the signal may also be sensed and recorded. This information may be correlated with other types of information in the same time instance, with other time instances in a fingerprint data structure 172 or with other fingerprint data structures in a mapping database. Devices may also possess resources for sensing magnetic fields. For example, in recording magnetic fields and using them as part of a fingerprint data structure 172 a base field derived from the Earth's magnetic field may be altered by disturbances such as wireless communication, machinery, metallic structures, etc. These disturbances may make the base field unique at different locations, and make sensing magnetic field information helpful for positioning.

FIG. 4 discloses an example of the above processes as follows. At time instance "1" object A 406 may be visible and a particular magnetic field may exist based on localized field 408 created due to motor/power equipment associated with an elevator. The impact of localized magnetic field 408 is represented in graph 414 which shows a certain intensity (Y-axis) at time instance 1 (X-axis). Further, graph 422 shows object A 406 (Y-axis) as being visible (e.g., above the "VISIBILITY" line) at time instance 1 (X-axis). In this manner, visual information associated with a location (e.g., a time instance in a fingerprint) may be associated with sensed magnetic field information.

However, more information may be available. Access point (AP) 412 may be present in hallway 400. The signal strength of AP 412 is shown in graph 416, and this information may be recorded at various time instances in a fingerprint data structure 172, along within current device 100 direction sensing (if available) such as shown in graph 418. As each subsequent time instance is triggered in FIG. 4, observed differences that are sensed in hallway 400 becomes apparent. For example, object A may be visible in fingerprints 1 and 2, but then become invisible (go out of sight) in fingerprints 3-10. The intensity of electromagnetic field source 408 peaks between time instances 2 and 3 and then drops in subsequent time instances, which may alter the disposition of the magnetic field sensed at these instances. The sensed magnetic field may continue to evolve when secondary source 410 is encountered around time instances 5 and 6. Direction graph 418 may remain relatively constant, despite some variation in the orientation of the device, until time instance 6 where a substantial change in direction is observed. In this manner, the actual direction of the device 100 may be filtered or taken into account. For example, the direction of the device 100 may be filtered in order to account for a user walking down hallway 400. On the other hand, the direction of the device 100 may be taken into account when recording the visibility of objects A-E in subsequent time instances.

For example, object B may be visible at time instances 3 and 4 per graph 424 even though the orientation of the device 100 shown in FIG. 4 may not actually bring object B into the captured image frame. Sensed information may be adjusted to correct for extenuating factors as a part of correlating of one form of sensed information with other forms of information sensed at the same instance in time, as a result of corrections provided via crowd sourcing, etc. Such corrective activities may also be implemented for sensing objects C-E at time instance 6, where objects C-E may not be recorded as visible though they arguably "could" be visible based on device 100 orientation. Graphs 426-430 pertain to objects C-E, respectively, and reflect that objects "should" be visible based on user-submitted corrections or other corrective algorithms employed during information processing. As disclosed in FIG. 4, graphs 426-430 do shown that objects C-E should all be visible in time instance 6, while object C is not visible after time instance 7, object D is not visible after time instance 8, and object E is still visible even after time instance 10.

In accordance with at least one embodiment of the invention, the information sensed at instances in time may be correlated. Correlation may take many forms. For example, motion (e.g., direction, position, acceleration, etc.) may be sensed at various time instances. Timing information may be determined by simply determine the change in time from one instance to a subsequent instance. Sensed motion information may be evaluated in view of the timing information in order to determine a "step" size. Example step size graph 420 discloses a calculated distance traversed by a device 100 from the previous time instance. The steps calculated at time instances 5-7 are shorter in graph 420 as the user of the device 100 was turning a corner in hallway 400. Step size may be further used to provide dimension or scaling to visual elements extracted from visual information. For example, the dimensions, position, orientation, etc. of visual elements may be determined based on step size. This information may also be used to adjust the scale of information recorded at an instance in time in order to store this information in association with previously stored information corresponding to previous time instances in the same fingerprint data structure 172. After completion of correlation processes such as set forth above, information sensed at a time instance may then be referred to as correlated information.

Information sensed for an attribute of a location in one form may also be correlated with information sensed for the same attribute in another form. For example, AP 412 may be identified based on communication activity and communication strength or intensity information may also be sensed. This information may be correlated in order to link the identification of AP 412 to the sensed signal intensity at a particular instance in time. In accordance with at least one embodiment of the invention, the signal strength information may be further processed in order to approximate a distance from the sensing device 100 to AP 412 at an instance in time. This may help to determine device 100 position, or if AP 412 is "visibly" sensed in hallway 412, it may further be extracted as a visual element from the recorded image information in at least time instances 5 and 6. Part of the correlation may therefore include associating the extracted visual element of AP 412 in time instances 5 and 6 with the signal and/or identification information sensed for AP 412. Such association may, for example, allow distances determined during the processing of the sensed signal information to be applied to the sensed visual information for determining a distance/size scale for extracted visual elements.

Graphs 414-420 and 422-430 in FIG. 4 disclose examples of fingerprint data information accumulated over time. Fingerprint data structures 172 may be associated with other fingerprint data structures 172 in mapping databases to form a representation of an area such as the interior of a structure. Each time instance may be sensed, processed and then stored in association with previous time instances to form fingerprint data structures 172 that may be further associated in a mapping database in order to create the graphical relationships such as disclosed in FIG. 4.

Figure 5:
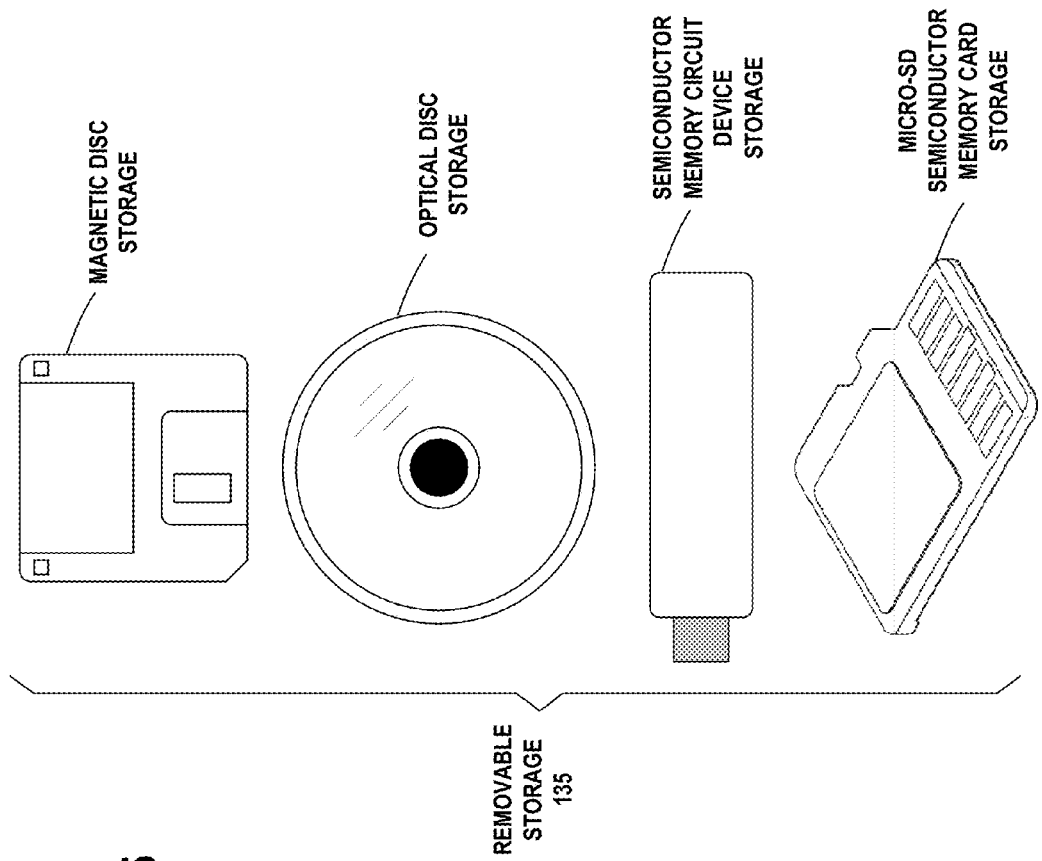
FIG. 5 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

FIG. 5 illustrates an example embodiment of the invention, wherein examples of removable storage media 135 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

An example embodiment of the invention comprises:

means for generating in a mobile wireless device, an empty grid template of grid nodes representing one or more floor areas in an enclosed space, based on a map of the enclosed space;

means for estimating in the mobile wireless device, locations along a path of motion of a user of the mobile wireless device traversing the one or more floor areas, based on motion observations made by a motion sensor in the mobile wireless device and map information;

means for generating a radiomap of the one or more floor areas by making radio measurements with the mobile wireless device, at the estimated locations along the path of motion, and mapping the measurements to the generated grid nodes that are closest to the estimated locations; and means for compiling in the mobile wireless device, a fingerprint data structure of the radiomap, including observation elements representing the radio measurements at the mapped grid nodes.

An example embodiment of the invention comprises:

means for receiving at a server, a fingerprint data structure of a radiomap representing one or more floor areas in an enclosed space, from a mobile wireless device, the fingerprint data structure including observation elements representing radio measurements at mapped grid nodes of one or more floor areas, and means for combining at the server, the received radiomap with radiomaps of the one or more floor areas, received from other mobile wireless devices.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
dynamically generating in a mobile wireless device, grid nodes representing two or more floor areas in an enclosed space, based on a map of the enclosed space;
estimating in the mobile wireless device, locations along a path of motion of a user of the mobile wireless device traversing the two or more floor areas, based on motion observations made by a motion sensor in the mobile wireless device and map information;
generating a radiomap of the two or more floor areas by making radio measurements at time instances with the mobile wireless device, at the estimated locations along the path of motion, and mapping the measurements to the generated grid nodes that are closest to the estimated locations;
compiling in the mobile wireless device, a three dimensional fingerprint data structure of the radiomap of the two or more floor areas, including observation elements representing the radio measurements made at the time instances at the mapped grid nodes;
repeating making radio measurements at later time instances with the mobile wireless device, at locations along a repeated path of motion of the user of the mobile wireless device repeating a traverse of the two or more floor areas, based on motion observations made by the motion sensor in the mobile wireless device along the repeated path of motion; and
combining in the mobile wireless device, the repeated radio measurements made at the later time instances, with the radio measurements represented by the observation elements of the three dimensional fingerprint data structure of the radiomap, to learn a refined radiomap of the two or more floor areas.

2. The method of claim 1, wherein the path of motion of a user of the mobile wireless device traverses floor areas in two or more stories of a multistory building and the radiomap and fingerprint data structure represent the floor areas in the two or more stories of the multistory building.

3. The method of claim 1, wherein the measurements are at least one of MAC addresses, received signal strength indication (RSSI), radio frequency (F), electromagnetic field strength, electromagnetic radiation intensity and power.

4. The method of claim 1, further comprising:
transmitting the fingerprint data structure of the radiomap to two or more global servers for combining at the server with radiomaps of the two or more floor areas, from other mobile wireless devices.

5. The method of claim 1, further comprising:
sending a request to a global server for a fingerprint data structure of a radiomap of representing floor areas in two or more stories of a multistory building; and
receiving information representing at least one of a fingerprint data structure or models of a radiomap representing the requested floor areas, which is a representation of a combination of two or more radiomaps from other mobile wireless devices.

6. A method, comprising:
generating in a mobile wireless device, grid nodes representing two or more floor areas in an enclosed space, based on a map of the enclosed space;
estimating in the mobile wireless device, locations along a path of motion of a user of the mobile wireless device traversing the two or more floor areas, based on motion observations made by a motion sensor in the mobile wireless device and map information;
generating a radiomap of the two or more floor areas by making radio measurements with the mobile wireless device, at the estimated locations along the path of motion, and mapping the measurements to the generated grid nodes that are closest to the estimated locations;
compiling in the mobile wireless device, a fingerprint data structure of the radiomap, including observation elements representing the radio measurements at the mapped grid nodes;
accessing the fingerprint data structure of the radiomap, including observation elements representing the radio measurements at the mapped grid nodes;
learning more accurate position information by repeating estimating in the mobile wireless device, locations along a repeated path of motion of the user of the mobile wireless device repeating a traverse of the two or more floor areas, based on motion observations made by a motion sensor in the mobile wireless device;
repeating making radio measurements with the mobile wireless device, at the estimated repeated locations along the repeated path of motion, mapping the repeated measurements to grid nodes of a grid template that are closest to the estimated repeated locations; and
combining in the mobile wireless device, the repeated measurements with the measurements represented by the observation elements of the fingerprint data structure of the radiomap, to learn a refined radiomap of the two or more floor areas.

7. A method, comprising:
receiving at a server, a first three dimensional fingerprint data structure of a first radiomap representing two or more floor areas in an enclosed space, from a first mobile wireless device at locations along a path of motion of the first mobile wireless device, the first fingerprint data structure including observation elements representing first radio measurements at mapped grid nodes of two or more floor areas;
receiving at the server, a second three dimensional fingerprint data structure of a second radiomap representing the two or more floor areas in the enclosed space, from a second mobile wireless device at locations along a repeated path of the path of motion of the first mobile wireless device, the second mobile wireless device repeating a traverse of the two or more floor areas, the second fingerprint data structure including observation elements representing second radio measurements at the mapped grid nodes of the two or more floor areas; and
combining at the server, the received first and second three dimensional fingerprint data structures with radiomaps of the two or more floor areas, received from other mobile wireless devices, to generate a crowd-sourced radiomap, by combining the observation elements of the first and second three dimensional fingerprint data structures combined with observation elements of the radiomaps received from the other mobile wireless devices, to generate a crowd-sourced three dimensional fingerprint data structure representing a refined crowd-sourced radiomap of the two or more floor areas.

8. The method of claim 7, wherein the received radiomap and the radiomaps received from other mobile wireless devices, represent floor areas in two or more stories of a multistory building.

9. The method of claim 7, wherein the observation elements represent radio measurements that are of at least one of MAC addresses, received signal strength indication (RSSI), radio frequency (F), electromagnetic field strength, and electromagnetic radiation intensity and power.

10. The method of claim 7, further comprising:
receiving a request from a mobile wireless device for a fingerprint data structure of a radiomap of representing floor areas in two or more stories of a multistory building; and
transmitting to the mobile wireless device representing at least one of a fingerprint data structure or models of a radiomap representing the requested floor areas, which is a representation of a combination of two or more radiomaps from other mobile wireless devices.

11. An apparatus, comprising:
at least one processor;
at least one memory including computer program code;
the at least one memory and the computer program code configured to, with the at least one processor, cause the apparatus at least to:
dynamically generate grid nodes representing two or more floor areas in an enclosed space, based on a map of the enclosed space;
estimate locations along a path of motion of a user of the apparatus traversing the two or more floor areas, based on motion observations made by a motion sensor in the apparatus and map information;
generate a radiomap of the two or more floor areas by making radio measurements at time instances with the apparatus, at the estimated locations along the path of motion, and mapping the measurements to the generated grid nodes that are closest to the estimated locations;
compile a three dimensional fingerprint data structure of the radiomap of the two or more floor areas, including observation elements representing the radio measurements made at the time instances at the mapped grid nodes;
repeat making radio measurements at later time instances, at locations along a repeated path of motion of the user of the apparatus repeating a traverse of the two or more floor areas, based on motion observations made by the motion sensor in the apparatus along the repeated path of motion; and
combine the repeated radio measurements made at the later time instances, with the radio measurements represented by the observation elements of the three dimensional fingerprint data structure of the radiomap, to learn a refined radiomap of the two or more floor areas.

12. The apparatus of claim 11, wherein the path of motion of a user of the apparatus traverses floor areas in two or more stories of a multistory building and the radiomap and fingerprint data structure represent the floor areas in the two or more stories of the multistory building.

13. The apparatus of claim 11, wherein the radio measurements are at least one of MAC addresses, received signal strength indication (RSSI), radio frequency (F), electromagnetic field strength, and electromagnetic radiation intensity and power.

14. The apparatus of claim 11, further comprising:
the at least one memory and the computer program code configured to, with the at least one processor, cause the apparatus at least to:
transmit the fingerprint data structure of the radiomap to a global server for combining at the server with radiomaps of the two or more floor areas, from other mobile wireless devices.

15. The apparatus of claim 11, further comprising:
the at least one memory and the computer program code configured to, with the at least one processor, cause the apparatus at least to:
send a request to a global server for a fingerprint data structure of a radiomap of representing floor areas in two or more stories of a multistory building; and
receive information representing a fingerprint data structure of a radiomap representing the requested floor areas, which is a representation of a combination of two or more radiomaps from other mobile wireless devices.

16. An apparatus, comprising:
at least one processor;
at least one memory including computer program code;
the at least one memory and the computer program code configured to, with the at least one processor, cause the apparatus at least to:
generate grid nodes representing two or more floor areas in an enclosed space, based on a map of the enclosed space;
estimate locations along a path of motion of a user of the apparatus traversing the two or more floor areas, based on motion observations made by a motion sensor in the apparatus and map information;
generate a radiomap of the two or more floor areas by making radio measurements with the apparatus, at the estimated locations along the path of motion, and mapping the measurements to the generated grid nodes that are closest to the estimated locations;
compile a fingerprint data structure of the radiomap, including observation elements representing the radio measurements at the mapped grid nodes;
access the fingerprint data structure of the radiomap, including observation elements representing the radio measurements at the mapped grid nodes;
learn more accurate position information by repeating estimating locations along a repeated path of motion of the user of the apparatus repeating a traverse of the two or more floor areas, based on motion observations made by a motion sensor in the apparatus;
repeat making radio measurements with the apparatus, at the estimated repeated locations along the repeated path of motion, and
map the repeated measurements to grid nodes that are closest to the estimated repeated locations; and
combine the repeated measurements with the measurements represented by the observation elements of the fingerprint data structure of the radiomap, to learn a refined radiomap of the two or more floor areas.

17. An apparatus, comprising:
at least one processor;
at least one memory including computer program code;
the at least one memory and the computer program code configured to, with the at least one processor, cause the apparatus at least to:
receive a first three dimensional fingerprint data structure of a first radiomap representing two or more floor areas in an enclosed space, from a first mobile wireless device at locations along a path of motion of the first mobile wireless device, the first fingerprint data structure including observation elements representing first radio measurements at mapped grid nodes of two or more floor areas;

receive a second three dimensional fingerprint data structure of a second radiomap representing the two or more floor areas in the enclosed space, from a second mobile wireless device at locations along a repeated path of the path of motion of the first mobile wireless device, the second mobile wireless device repeating a traverse of the two or more floor areas, the second fingerprint data structure including observation elements representing second radio measurements at the mapped grid nodes of the two or more floor areas; and combine the received first and second three dimensional fingerprint data structures with radiomaps of the two or more floor areas, received from other mobile wireless devices, to generate a crowd-sourced radiomap, by combining the observation elements of the first and second three dimensional fingerprint data structures combined with observation elements of the radiomaps received from the other mobile wireless devices, to generate a crowd-sourced three dimensional fingerprint data structure representing a refined crowd-sourced radiomap of the two or more floor areas.

18. The apparatus of claim 17, wherein the received radiomap and the radiomaps received from other mobile wireless devices, represent floor areas in two or more stories of a multistory building.

19. The apparatus of claim 17, wherein the observation elements represent radio measurements that are of at least one of MAC addresses, received signal strength indication (RSSI), radio frequency (F), electromagnetic field strength, and electromagnetic radiation intensity and power.

20. The apparatus of claim 17, further comprising:
the at least one memory and the computer program code configured to, with the at least one processor, cause the apparatus at least to:
receive a request from a mobile wireless device for a fingerprint data structure of a radiomap of representing floor areas in two or more stories of a multistory building; and
transmit to the mobile wireless device information representing a fingerprint data structure of a radiomap representing the requested floor areas, which is a representation of a combination of two or more radiomaps from other mobile wireless devices.

21. A computer readable non-transitory storage medium including computer executable program code recorded thereon, the computer executable program code, when executed by a computer, performs the actions comprising:
dynamically generating in a mobile wireless device, grid nodes representing two or more floor areas in an enclosed space, based on a map of the enclosed space;
estimating in the mobile wireless device, locations along a path of motion of a user of the mobile wireless device traversing the two or more floor areas, based on motion observations made by a motion sensor in the mobile wireless device and map information;
generating a radiomap of the two or more floor areas by making radio measurements at time instances with the mobile wireless device, at the estimated locations along the path of motion, and mapping the measurements to the generated grid nodes that are closest to the estimated locations;
compiling in the mobile wireless device, a three dimensional fingerprint data structure of the radiomap of the two or more floor areas, including observation elements representing the radio measurements made at the time instances at the mapped grid nodes;
repeating making radio measurements at later time instances with the mobile wireless device, at locations along a repeated path of motion of the user of the mobile wireless device repeating a traverse of the two or more floor areas, based on motion observations made by the motion sensor in the mobile wireless device along the repeated path of motion; and
combining in the mobile wireless device, the repeated radio measurements made at the later time instances, with the radio measurements represented by the observation elements of the three dimensional fingerprint data structure of the radiomap, to learn a refined radiomap of the two or more floor areas.

22. A computer readable non-transitory storage medium including computer executable program code recorded thereon, the computer executable program code, when executed by a computer, performs the actions comprising:
receiving at a server, a first three dimensional fingerprint data structure of a first radiomap representing two or more floor areas in an enclosed space, from a first mobile wireless device at locations along a path of motion of the first mobile wireless device, the first fingerprint data structure including observation elements representing first radio measurements at mapped grid nodes of two or more floor areas;
receiving at the server, a second three dimensional fingerprint data structure of a second radiomap representing the two or more floor areas in the enclosed space, from a second mobile wireless device at locations along a repeated path of the path of motion of the first mobile wireless device, the second mobile wireless device repeating a traverse of the two or more floor areas, the second fingerprint data structure including observation elements representing second radio measurements at the mapped grid nodes of the two or more floor areas; and
combining at the server, the received first and second three dimensional fingerprint data structures with radiomaps of the two or more floor areas, received from other mobile wireless devices, to generate a crowd-sourced radiomap, by combining the observation elements of the first and second three dimensional fingerprint data structures combined with observation elements of the radiomaps received from the other mobile wireless devices, to generate a crowd-sourced three dimensional fingerprint data structure representing a refined crowd-sourced radiomap of the two or more floor areas.

* * * * *